US010424962B2

(12) United States Patent
Graham et al.

(10) Patent No.: US 10,424,962 B2
(45) Date of Patent: Sep. 24, 2019

(54) CHARGING ASSEMBLY FOR WIRELESS POWER TRANSFER

(71) Applicant: APPLE INC., Cupertino, CA (US)

(72) Inventors: Christopher S. Graham, San Francisco, CA (US); Paul J. Thompson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 60 days.

(21) Appl. No.: 14/871,890

(22) Filed: Sep. 30, 2015

(65) Prior Publication Data
US 2017/0093198 A1    Mar. 30, 2017

(51) Int. Cl.
| H02J 7/02 | (2016.01) |
| H01F 27/36 | (2006.01) |
| H02J 7/00 | (2006.01) |
| H04B 5/00 | (2006.01) |
| H02J 50/10 | (2016.01) |
| H01F 38/14 | (2006.01) |
| H01F 27/02 | (2006.01) |

(52) U.S. Cl.
CPC .......... H02J 7/025 (2013.01); H01F 27/362 (2013.01); H01F 27/365 (2013.01); H01F 38/14 (2013.01); H02J 7/0042 (2013.01); H02J 7/0044 (2013.01); H02J 50/10 (2016.02); H04B 5/0037 (2013.01); H04B 5/0081 (2013.01); H01F 27/02 (2013.01)

(58) Field of Classification Search
CPC ............................... H02J 7/025; H02J 7/0042
USPC ........................................................ 320/108
See application file for complete search history.

(56) References Cited

U.S. PATENT DOCUMENTS

2010/0022285 A1   1/2010 Randall et al.
2012/0218211 A1*  8/2012 McRae ................. G06F 1/1656
                                                                345/173
(Continued)

FOREIGN PATENT DOCUMENTS

EP        2645521      10/2013
JP       10191572       7/1998
(Continued)

OTHER PUBLICATIONS

EP16185100.1, "Extended European Search Report", dated Feb. 24, 2017, 8 pages.
(Continued)

*Primary Examiner* — Nathaniel R Pelton
*Assistant Examiner* — Johali A Torres Ruiz
(74) *Attorney, Agent, or Firm* — Kilpatrick Townsend & Stockton LLP

(57) ABSTRACT

A charging assembly for wireless power transfer. In embodiments, the charging assembly comprises a housing, a cap structure, a ferrimagnetic sleeve, an inductive coil, a magnet, a printed circuit board assembly (PCBA), and a four-pin connector extending from a bottom surface of the PCBA. A ridge of the cap structure can be coupled to a lip of the housing. The housing can include a bottom housing surface having an aperture, and a sidewall extending between the bottom housing surface and the lip that extends outward from the sidewall along a perimeter of the housing parallel to the bottom housing surface. The four-pin connector can extend through the aperture of the housing. Some embodiments are directed to a charging device that incorporates the charging assembly.

17 Claims, 8 Drawing Sheets

(56) References Cited

U.S. PATENT DOCUMENTS

| | | | |
|---|---|---|---|
| 2012/0319647 A1* | 12/2012 | Itabashi | H02M 3/33553 320/108 |
| 2013/0113423 A1* | 5/2013 | Baarman | H01F 38/14 320/108 |
| 2013/0181535 A1 | 7/2013 | Muratov et al. | |
| 2013/0204085 A1* | 8/2013 | Alexander | A61B 1/05 600/109 |
| 2013/0257366 A1 | 10/2013 | Scholz et al. | |
| 2014/0091758 A1* | 4/2014 | Hidaka | H01F 38/14 320/108 |
| 2014/0197782 A1 | 7/2014 | Graf et al. | |
| 2014/0203771 A1 | 7/2014 | Hsu et al. | |
| 2015/0002088 A1* | 1/2015 | D'Agostino | H02J 7/0044 320/108 |
| 2015/0012604 A1* | 1/2015 | Lee | H04L 51/046 709/206 |
| 2015/0162767 A1 | 6/2015 | Oh et al. | |
| 2015/0270058 A1 | 9/2015 | Golko et al. | |
| 2015/0288067 A1* | 10/2015 | Kwon | H01Q 1/22 320/108 |
| 2015/0290373 A1* | 10/2015 | Rudser | A61M 1/1086 623/3.27 |
| 2016/0372948 A1* | 12/2016 | Kvols | H02J 7/0042 |

FOREIGN PATENT DOCUMENTS

| | | |
|---|---|---|
| JP | 2012514967 | 6/2012 |
| JP | 2013070606 | 4/2013 |
| JP | 2013215079 | 10/2013 |
| WO | 2011096569 | 8/2011 |
| WO | 2012157114 | 11/2012 |
| WO | 2013/093922 A2 | 6/2013 |

OTHER PUBLICATIONS

Australian Patent Application No. 2016219550 , "Second Examination Report", dated May 18, 2018, 8 pages.

Kim et al., "A Comparison of Analysis and Measurements of the Electromagnetic Shielding Material for Wireless Charging Devices", Journal of 2015 Summer Conference, The Korean Institute of Electrical Engineers, Jul. 17, 2015, pp. 856-857.

Korean Patent Application No. 10-2016-0110481 , "Office Action", dated Mar. 27, 2018, 16 pages.

Japanese Patent Application No. JP2016-166626 , "Office Action", dated Nov. 6, 2017, 8 pages.

* cited by examiner

CHARGING ASSEMBLY FOR WIRELESS POWER TRANSFER

FIELD

The present invention relates generally to a wireless charging assembly. More particularly, the present invention relates to a wireless charging assembly that can be used as a component in a charging device such as a charging station.

BACKGROUND

Mobile devices such as smart phones, tablets, smart watches, and the like can be configured for wireless charging. Such mobile devices are often sold along with a wireless charging device (e.g., a charging station) that is specifically configured for charging the mobile device and, in some instances, charging other devices made by the same manufacturer.

Some customers may prefer to use charging devices other than the charging station that comes with the mobile device at the time of purchase for a variety of reasons. Hence, there is a need to allow third-party manufacturers of charging devices such as docking stations to configure their charging devices for wireless charging of mobile devices that they themselves do not manufacture. In order for a third-party manufacturer's docking station to wirelessly charge such mobile devices, they may need a charging assembly compatible with both the docking station and the mobile device it is meant to charge.

Sometimes, third-party manufacturers also provide peripheral systems that utilize mobile devices and provide additional functionality, such as playing audio on speakers or video on a display device. These third-party manufacturers may wish to provide charging capabilities for mobile devices in such peripheral systems. In other words, they may wish to incorporate a charging device into the peripheral system.

Further, manufacturers of mobile devices may have a need for a modular wireless charging assembly that can be easily incorporated into different charging devices and peripheral systems also provided by the manufacturers of mobile devices.

SUMMARY

Some embodiments of the invention pertain to wireless charging assemblies with application in wireless charging devices. Other embodiments pertain to wireless charging devices including such wireless charging assemblies. The wireless charging assemblies in accordance with embodiments of the present invention can be used in charging device (such as third party charging devices), peripheral audio/video devices, and the like, but embodiments of the invention are not limited to such applications.

Some embodiments pertain to a wireless charging assembly comprising a housing, a cap structure, a ferrimagnetic sleeve, an inductive coil, a magnet, a printed circuit board assembly (PCBA), and a four-pin connector. The housing can include a bottom housing surface having an aperture, and a sidewall extending between the bottom housing surface and a lip that extends outward from the sidewall along a perimeter of the housing parallel to the bottom housing surface.

The cap structure can have a charging surface and a bottom cap surface opposite the charging surface. The bottom cap surface can include a ridge formed along a perimeter of the cap structure and can be coupled to the housing at the lip. In some embodiments, the bottom housing surface further can have a plurality of protrusions, each protrusion including a threaded screw hole configured to receive a screw or bolt.

The ferrimagnetic sleeve can be disposed within the housing. The ferrimagnetic sleeve can include first and second opposing faces, a central opening extending from the first face to the second face through the ferrimagnetic sleeve, and a recess surrounding the central opening and open at the first face.

The inductive coil can be disposed within the recess between the bottom cap surface and the second face of the ferrimagnetic sleeve. The inductive coil can be configured to wirelessly transmit power across the charging surface.

The magnet can be disposed within the central opening of the ferrimagnetic sleeve. The PCBA can be disposed within the housing between the second face of the ferrimagnetic sleeve and the bottom housing surface. The four-pin connector can be attached to (or part of) the PCBA and extend from a bottom surface of the PCBA through the aperture. The four-pin connector can be electrically coupled to the inductive coil. In some embodiments, the PCBA can comprise one or more contact pads configured to receive (and electrically couple to) wires from the inductive coil. In some embodiments, the PCBA can comprise wireless charging circuit elements.

The wireless charging assembly can further comprising an electromagnetic shield disposed between the bottom cap surface of the cap structure and the inductive coil. In some embodiments, the wireless charging assembly can further comprise an adhesive material disposed between the cap structure and the housing. In some embodiments, the wireless charging assembly is substantially impermeable to liquids.

In some embodiments, the wireless charging assembly can further comprising a guide element disposed in a notched portion of the ferrimagnetic sleeve. The guide element can be configured to guide the wires from the inductive coil to the one or more contact pads of the PCBA.

In some embodiments, the PCBA can include a hollow portion in which the magnet is disposed. The magnet can be separated from both the PCBA and the ferrimagnetic sleeve by a casing disposed around the magnet.

Some embodiments are directed to a charging device comprising a female connector configured to transmit power to a four-pin male connector, and a wireless charging assembly comprising a housing, a cap structure, a ferrimagnetic sleeve, an inductive coil, a magnet, a printed circuit board assembly (PCBA), and the male four-pin connector extending from the bottom surface of the PCBA.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Some embodiments described pertain to a wireless charging assembly that can be incorporated into a charging device (e.g. a "dock", "docking station", a portable battery, or a "charger"). The charging device can include (or be electrically coupled to) a power source that can provide power to charging circuitry of the charging assembly through a four-pin connector. The charging assembly can be used to wirelessly transmit power to the charging circuitry (e.g., a receiver coil) of a mobile device such as a wearable device. The mobile device can use the transmitted power to charge its internal battery. In addition to wearables, other examples of mobile devices can include smart phones, media players, personal digital assistants, tablet computers, laptop computers, and the like.

Figure 1:
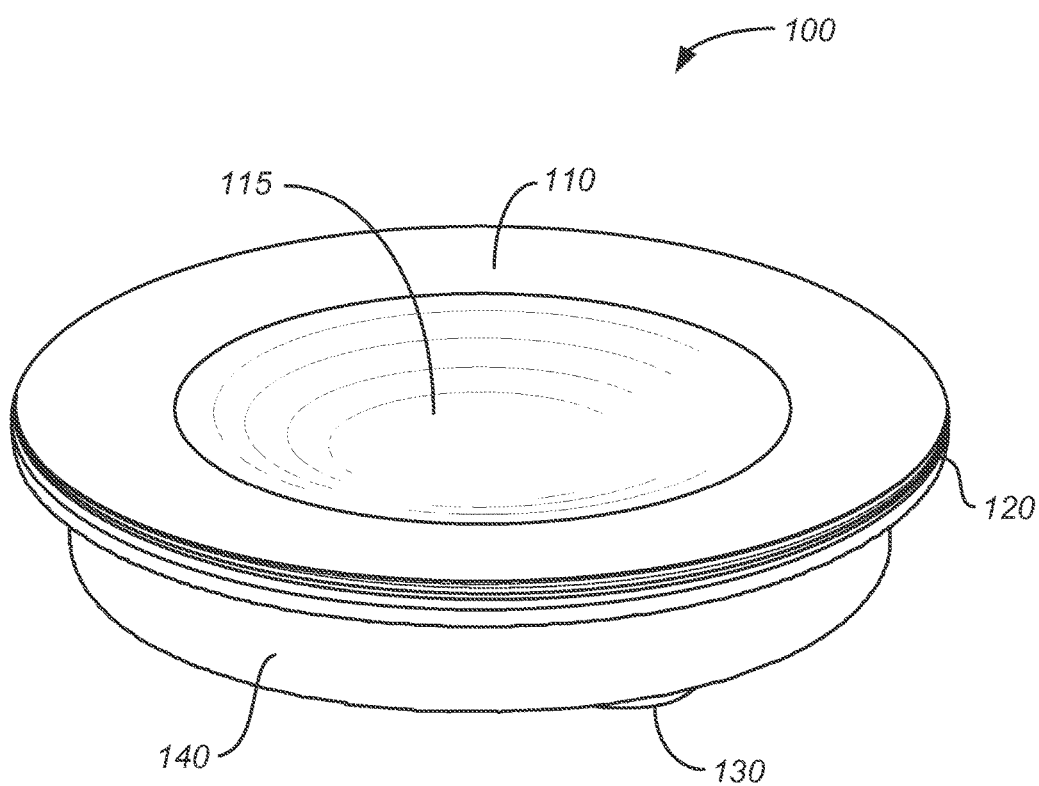
FIG. 1 is a top perspective view of a wireless charging assembly according to some embodiments.

FIG. 1 is a top perspective view of a wireless charging assembly 100 according to embodiments. As shown in FIG. 1, charging assembly 100 comprises a cap structure 110 and a housing 140. Cap structure 110 and housing 140 can be in contact (or almost in contact separated by a thin layer of adhesive) along a rim region 120 on the outer perimeter. Cap structure 110 can include a charging surface 115 which can have a shape contoured to support the corresponding charging surface of a coupled mobile device during wireless charging. For example, in the example shown in FIG. 1, charging surface 115 has a non-planar (i.e. concave) shape that corresponds to a convex charging surface of a mobile device. It should be noted, however, that although charging surface 115 has been shown with the concave shape, embodiments the invention are not limited to such. In other embodiments, charging surface 115 can have any other shape such as a convex shape, wavy shape, a planar shape, or any other suitable shape.

As shown in FIG. 1, charging assembly 100 comprises a housing 140 including a bottom housing surface. Although not apparent from the top perspective shown in FIG. 1, housing 140 can include an aperture and, in some embodiments, a plurality of protrusions, each protrusion including a screw hole as described below with reference to FIG. 2. A small portion of one protrusion 130 is visible in FIG. 1. Housing 140 includes a sidewall with a cylindrical portion extending between the bottom housing surface. Housing 140 also includes a lip (or "flange") that extends outward from the sidewall along a perimeter of the housing parallel to the bottom housing surface. Cap structure 110 can include a ridge along its parameter, the ridge being coupled to the lip of housing 140. The lip of housing 140, along with the parameter of cap structure 110 including the ridge, form rim region 120. Rim region 120 is described in further detail below with reference to FIG. 4. Cap structure 110 can have a bottom cap surface opposite charging surface 115 (not apparent from FIG. 1) and on which the ridge is disposed. In some embodiments, the ridge of cap structure 110 can be in physical contact with the lip of housing 140. In other embodiments, the ridge of cap structure 110 can be coupled to the lip of housing 140 using a thin layer of adhesive such as epoxy or resin.

Although shown in FIG. 1 as substantially cylindrical, charging assembly 100 can be formed in various shapes to match either a surface of the device-to-be-charged, or to fit a charging device, or both. For example, in embodiments, charging assembly 100 or charging surface 115 can be substantially cubic, triangular, spherical, etc. in shape. In embodiments, charging assembly 100 can be sized appropriately to the mobile device it is configured to charge.

Housing 140 and cap structure 110 can be made from a non-corrosive, chemically resistant, and inert material that can withstand mechanical and thermal stress. For example, housing 140 can be made from rigid materials such as a suitable metal, metal alloy, ceramic, plastic, or composite. In some embodiments, housing 140 can be made from a 300 series stainless steel, such as 304. Cap structure 110 can be made from any suitable ceramic, plastic, or composite. For example, in some embodiments, cap structure 110 can be made from a polycarbonate material. In embodiments, cap structure 110 and housing 140 can be coupled using an adhesive (e.g., a resin) such that charging assembly 100 is water and liquid resistant.

Figure 2:
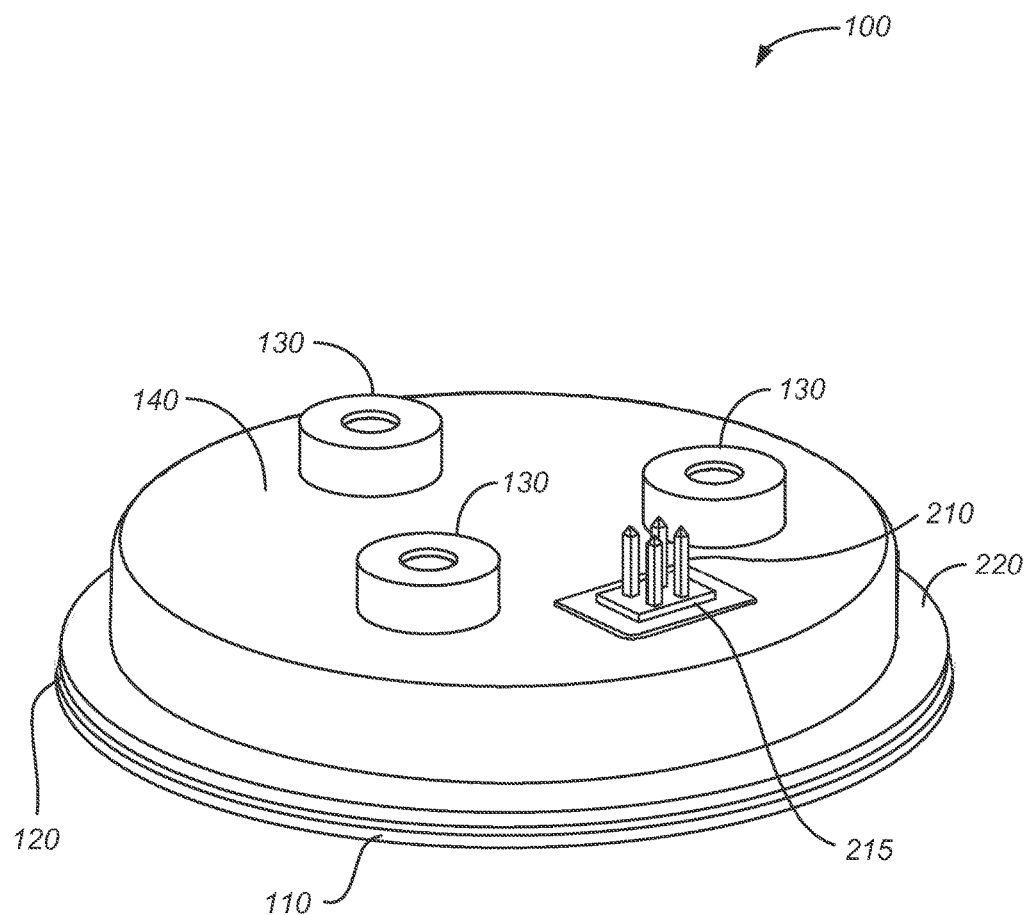
FIG. 2 is a bottom perspective view of the wireless charging assembly according to some embodiments.

FIG. 2 is a bottom perspective view of wireless charging assembly 100. As shown in FIG. 2, the ridge of cap structure 110 is coupled to a lip 220 of housing 140 at rim region 120. Three protrusions 130 including screw holes are shown forming an equilateral triangle on a bottom surface of housing 140 in the illustrated embodiment, although protrusions 130 and their screw holes can be disposed in any suitable configuration and in any suitable number. Although not apparent from FIG. 2, the screw holes can be threaded on an inner surface to accommodate threaded screws, bolts, and the like. I Protrusions 130 can comprise any suitable metal, metal alloy, ceramic, plastic, or composite. In some embodiments, protrusions 130 can comprise the same material as housing 140. As shown in FIG. 2, protrusions 130 can protrude from the bottom surface of housing 140. In some embodiments, protrusions 130 can be attached to housing 140 by means of an adhesive. In some other embodiments, protrusions 130 can be soldered onto housing 140. In yet other embodiments, the bottom surface of housing 140 and protrusions 130 are constructed from the same piece of material such that housing 140 and protrusions 130 form a unitary body. Protrusions 130 can be used to physically couple charging assembly 100 to a charging device. In embodiments, this can be achieved by fastening screws through screw-holes lining inner portion of protrusions 130.

In addition to or instead of restraining charging assembly 100 to a charging device using protrusions 130, a surface of lip 220 of housing 140 can be used to secure charging assembly 100 to a charging device using a glue or other adhesive. More specifically, a surface of lip 220 can be adhered to a surface of a charging device. In some embodiments, charging assembly 100 can be secured to a charging device using an adhesive at the surface of lip 220 in addition to screws or bolts inserted into the screw holes of protrusions 130. The size of lip 220 of housing 140 can be varied depending on the particular application, including and the external and/or internal surfaces of the charging device into which charging assembly 100 is incorporated. In some embodiments, where charging assembly 100 is secured to a charging device using adhesive, charging assembly 100 may not include protrusions 130 at the bottom of the housing.

As shown in FIG. 2, charging assembly 100 can include a four-pin connector 210. In FIG. 2, four-pin connector 210 is a male connector than can be electrically coupled to a charging device so that power can be provided to charging assembly 100. In some embodiments, four-pin connector 210 can be used to connect charging assembly 100 to a USB power supply. In embodiments, the four pins in four-pin connector 210 can correspond to USB plus, USB minus, power, and ground. In some embodiments, four-pin connector 210 can enable basic data transfer such as USB handoff in addition to power transfer. In some embodiments, four-pin connector 210 could be a debug header, where the USB plus and minus pins are data pins that can be used for debugging.

In some embodiments, four-pin connector 210 can be attached to a corresponding socketed female connector in a charging device. The female connector can be coupled to a source of power, such as a USB port (which in turn can derive power from a battery or power outlet) through a flexible cable. In some embodiments, four-pin connector 210 can be attached to a through-hole on a charging device printed circuit board (PCB) and soldered in place. In such embodiments, protrusions 130 can be used to attach housing 140 to the charging device PCB. Alternatively, the pins of four-pin connector 210 can be soldered directly to wires in a charging device that can eventually be connected to a source of power, such as a USB port.

In some embodiments, four-pin connector 210 can be attached to housing 140 at an aperture 215 with an adhesive, such as an epoxy resin. By sealing any empty space formed between the outer parameter of four-pin connector 210 and aperture 215, charging assembly 100 can be further impermeable to liquids such as water. In some embodiments, four-pin connector 210 can be soldered to housing 140 in addition to, or in place of, sealing with an adhesive.

Figure 3:
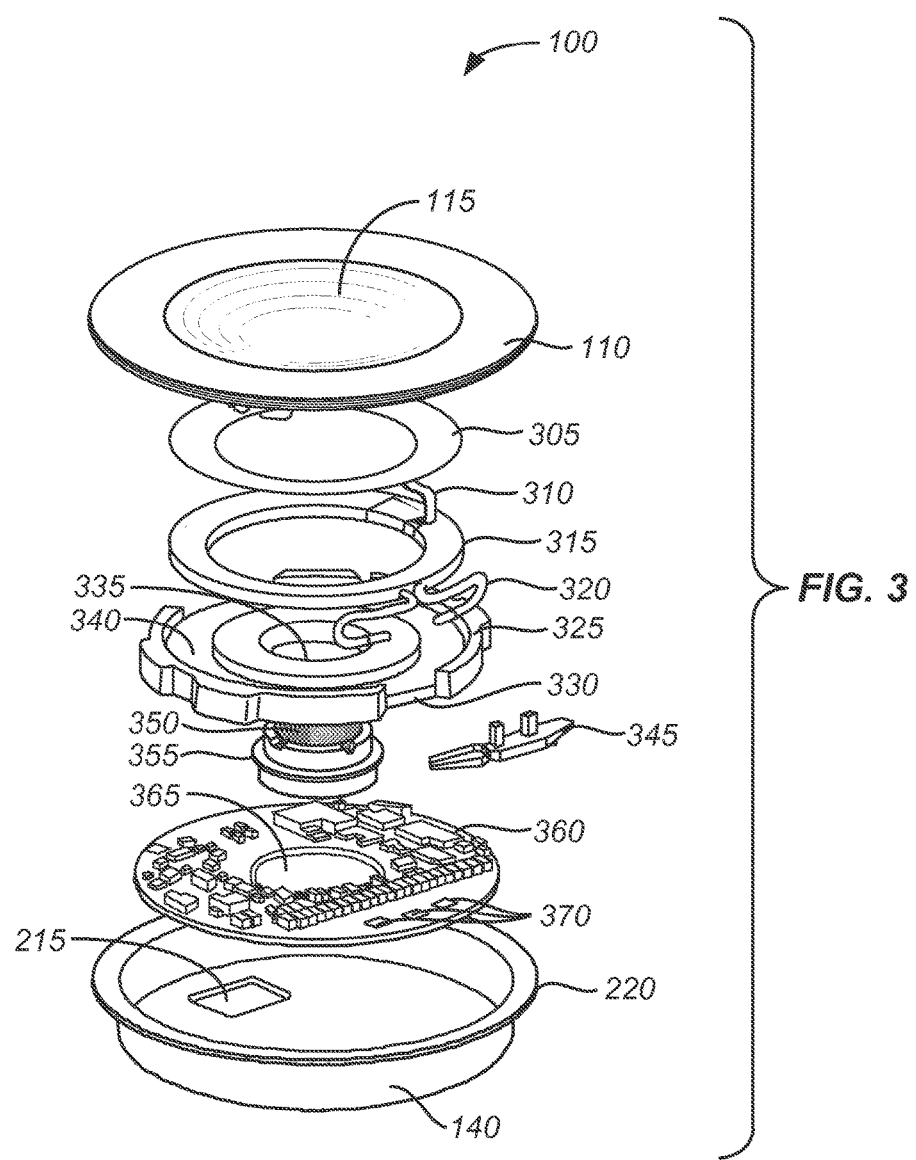
FIG. 3 is an illustration of an exploded view of the sub-components of the wireless charging assembly in a stack, according to some embodiments.

FIG. 3 is an illustration of an exploded view of the sub-components of wireless charging assembly 100 in a stack, according to some embodiments. In some embodiments, the sub-components except for cap structure 110 shown in FIG. 3 can be disposed predominantly within housing 140 and covered by cap structure 110. In some other embodiments, charging assembly 100 can contain more or less sub-components than those shown in FIG. 3.

Beginning from the top of FIG. 3, charging assembly 100 can comprise cap structure 110 with charging surface 115, as explained previously. Cap structure 110 can also be made from any suitable metal, metal alloy, ceramic, plastic, or composite. For example, in some embodiments, cap structure 110 can be made from a polycarbonate material. Cap structure 110 can be cast, machined, stamped, or formed as otherwise desired. Cap structure 110 can be made aesthetically pleasing because in some embodiments, cap structure 110 can be the only visible part from charging assembly 100 in a final charging device. In embodiments, after charging assembly 100 is incorporated into a charging device such as a docking station, the top surface of cap structure 110 can be the only visible part charging assembly 100 to a user.

In some embodiments, charging assembly 100 can include an electromagnetic shield 305 below cap structure 110. In embodiments, electromagnetic shield 305 can be a capacitive shield that helps to remove coupled noise between the charging system and the mobile device during a charging operation, or during the operation of a mobile device (for example, by touching a screen on the mobile device) when it is placed on charging surface 115. Electromagnetic shield 305 can drown out some or all of the capacitive coupling that can occur between an inductive coil 315 of charging assembly 100 and an inductive receiver coil in a mobile device. Such capacitive coupling can otherwise lead to ground noise, especially on the mobile device side. In embodiments, electromagnetic shield 305 can be grounded to a common ground for charging assembly 100. Housing 140 and other sub-components such as a Main Logic Board (MLB) on a Printed Circuit Board Assembly (PCBA) 360 can also be connected to the common ground.

Electromagnetic shield 305 can be made of a suitable thin, flexible, material in some embodiments. Electromagnetic shield 305 can comprise one or more layers including, for example, a dielectric layer, an adhesive layer, and a conductive layer. In other embodiments, electromagnetic shield 305 can be a conductive coating, for example deposited by Physical Vapor Deposition (PVD). In some examples, electromagnetic shield 305 can be an ink or a conductive Pressure Sensitive Adhesive. In some embodiments the total thickness of electromagnetic shield 305 can be of the order of 50 microns, including a conductive layer thickness of approximately 12 microns. Electromagnetic shield 305 can be attached to the ground by a ground connector 310. Electromagnetic shield 305 may not be present in some embodiments.

As shown in FIG. 3, charging assembly 100 can include inductive coil 315 below electromagnetic shield 305. Inductive coil 315 can be used to generate and transmit a time-varying electromagnetic field from, for example, an alternating current (AC) flowing through inductive coil 315. This field can generate a corresponding time-varying current within an inductive receiver coil in a mobile device coupled to charging assembly 100 by way of electromagnetic induction (not shown in FIG. 3). Thus, inductive coil 315 and the receiver coil can effectively form an electrical transformer.

In embodiments, inductive coil 315 can include one or more layers. In some embodiments, inductive coil 315 can be formed by patterning a multi-layer flexible structure comprising a layer of conductive material. In other embodiments, inductive coil 315 can be formed by winding an electrical conductive wire. In some embodiments, inductive coil 315 can be characterized by a three dimensional shape. The three-dimensional shape can be achieved, for example, by compression molding or vacuum forming of a substantially planar coil.

The conductive material in inductive coil 315 can comprise any suitable electrically conductive material including, but not limited to, metals (e.g. copper, gold, silver, etc.), alloys, semiconductors, conductive ceramics, conductive polymers, and the like. As shown in FIG. 3, inductive coil 315 can comprise lead wires 320. Inductive coil 315 can optionally comprise insulating material such as polyimide, PET, and other thermoformable materials. In some embodiments, lead wires 320 can correspond to positive and negative signals and can be used to transmit a time-varying current through inductive coil 315. As will be described in further detail below, lead wires 320 can be guided through a guide 345 and can make contact with contact pads 370 on PCBA 360.

As shown in FIG. 3, charging assembly 100 can include a ferrimagnetic sleeve 325 disposed such that inductive coil 315 is located between ferrimagnetic sleeve 325 and cap structure 110. Ferrimagnetic sleeve 325 can help direct the electromagnetic flux lines from inductive coil 315 to an inductive receiver coil in a charging mobile device. Ferrimagnetic sleeve 325 can also shield PCBA 360 from electromagnetic fields by providing a low magnetic loss path for the flux lines through ferrimagnetic sleeve 325. Ferrimagnetic sleeve 325 can be comprised of ferrite material (ceramic material composed of iron oxide) or any other suitable ferrimagnetic material. In embodiments, ferrimagnetic sleeve 325 can be polymer based.

Ferrimagnetic sleeve 325 can include a first and second opposing faces, and a central opening 335. As shown in FIG. 3, the first face of ferrimagnetic sleeve 325 is the top face and the second face is the bottom face. In embodiments such as those shown in FIG. 3, central opening 335 can be substantially concentric to electromagnetic shield 305 and inductive coil 315. Ferrimagnetic sleeve 325 can also include a recess 340 open at the first face and surrounding central opening 335. Inductive coil 315 can be disposed in recess 340 such that is it effectively located between the bottom cap surface and the bottom face of the ferrimagnetic sleeve 325, as shown in FIG. 3.

In some embodiments, ferrimagnetic sleeve 325 can include a notched portion 330 as shown in FIG. 3. In such embodiments, wireless charging assembly 100 can include a guide element 345 disposed in notched portion 330. Guide element 345 can comprise a plurality of holes or channels that can be used to guide wires from inductive coil 315 to one or more contact pads 370 on PCBA 360. In embodiments where there is limited space inside charging assembly 100 (e.g., within housing 140), guide element 345 can help manage lead wires 320 from inductive coil 315 such that lead wires 320 do not splay and/or come into contact with certain sub-components of charging assembly 100.

As shown in FIG. 3, charging assembly 100 can include a magnet 350 disposed at least partially within central opening 335 of ferrimagnetic sleeve 325. In embodiments, magnet 350 can also extend into a hollow portion 365 of PCBA 360. As shown in FIG. 3, magnet 350 can also be surrounded by a casing 355. Casing 355 can be substantially conformal to magnet 350 and can isolate (e.g., physically and electrically) magnet 350 from both PCBA 360 and ferrimagnetic sleeve 325. Magnet 350 can be used in conjunction with a corresponding magnet located in a mobile device to be charged to align the mobile device to charging assembly 100. More particularly, magnet 350 can be used to align inductive coil 315 and an inductive receiver coil in the mobile device during a charging operation to maximize efficiency of charging.

As further shown in FIG. 3, charging assembly 100 can include PCBA 360 disposed within housing 140 between the second surface of ferrimagnetic sleeve 325 and the bottom housing surface. PCBA 360 can include power circuit elements for wireless charging. In some embodiments, PCBA 360 can comprise one or more contact pads 370. Three contact pads are shown in FIG. 3: in one example, two contact pads can provide connection to the lead wires 320 (positive and negative) from inductive coil 315, and one contact pad can provide connection (e.g., a ground) to electromagnetic shield 305, thereby forming three service loops inside charging assembly 100.

Although not apparent from FIG. 3, PCBA 360 includes a four-pin connector attached to and/or extending from a bottom surface of PCBA 360 opposite the surface comprising contact pads 370. This four-pin connector can be a male four-pin connector such as four-pin connector 210 shown in FIG. 2. The male four-pin connector can extend through aperture 215 of housing 140. In embodiments, the male four-pin connector can be attached to a power supply of a charging device into which charging assembly 100 is incorporated.

All the sub-components shown in FIG. 3 can be assembled together and compressed to form the final charging assembly 100 as shown in FIGS. 1 and 2. Several sub-components, for example those sub-components shown in FIG. 3 as above the PCBA, can be attached to the bottom cap surface of cap structure 110 with an adhesive such as a glue, Pressure Sensitive Adhesive (PSA), or the like. PCBA 360 can be conductively adhered to housing 140 (e.g., using a conductive PSA). As shown in FIG. 2, the four-pin connector can be sealed at aperture 215 by using an ultraviolet curing (UV) glue. The four-pin connector can be attached to the PCBA by soldering. Lead wires 320 of inductive coil 315 can be coupled (e.g., soldered) to contact pads 370 of PCBA 360. Housing 140 can be filled with an adhesive such as resin over PCBA 360. The resin can comprise, for example, epoxy, acrylic, polyimide, or other adhesives. Components above PCBA 360 in FIG. 3 can be pushed down into housing 140 towards PCBA 360. During the process, some of the resin is displaced such that it creeps up into the region between the ridge of cap structure 110 and lip 220 of housing 140, thereby coupling cap structure 110 with housing 140.

The various sub-components of charging assembly 100 can be sensitive to moisture and vibrations. In some embodiments, as summarized above, the various sub-components can be "potted" by a non-conductive adhesive material such as a resin. For example, a liquid settable epoxy can be used to fill, partly or wholly, any spaces between the sub-components, housing 140, and the bottom cap surface of cap structure 110. Such an encapsulated assembly can provide various advantages. For example, the a non-conductive adhesive material can offer substantial impermeability to liquids and resistance to shock and vibrations.

Figure 4:
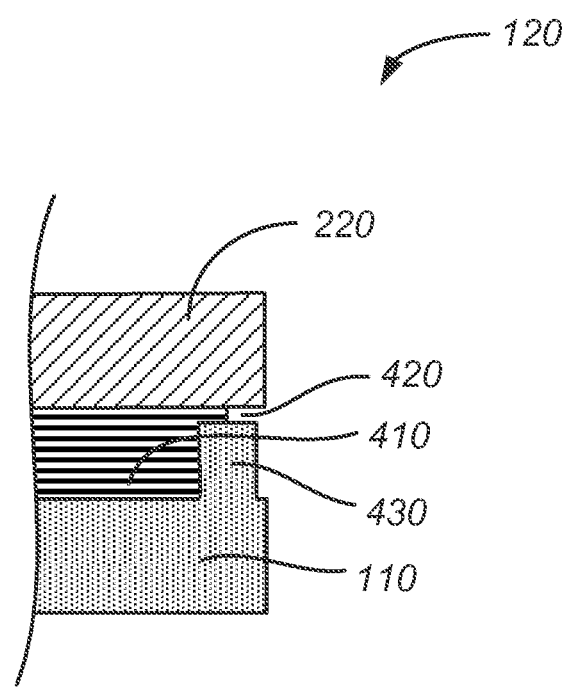
FIG. 4 is a simplified cross section of a portion of the wireless charging assembly including a ridge of the cap structure coupled to a lip of the housing, according to some embodiments.

FIG. 4 is a simplified cross section of rim region 120 of wireless charging assembly 100, including a ridge 430 of cap structure 110 and lip 220 of housing 140, according to an embodiment. As described above, when components are pushed down into housing 140 towards PCBA 360, some of the resin can be displaced such that it creeps up into the region between ridge 430 of cap structure 110 and lip 220 of housing 140, thereby coupling cap structure 110 with housing 140. When cured, the resin can bond cap structure 110 to housing 140 at surface contact 420, thereby making the seal water and/or air tight. In some embodiments, the setting process can involve the application of heat and/or pressure. In some embodiments, a layer of adhesive can optionally also be applied on surface contact 420, although other embodiments may not involve adhesive on surface contact 420.

Figure 5:
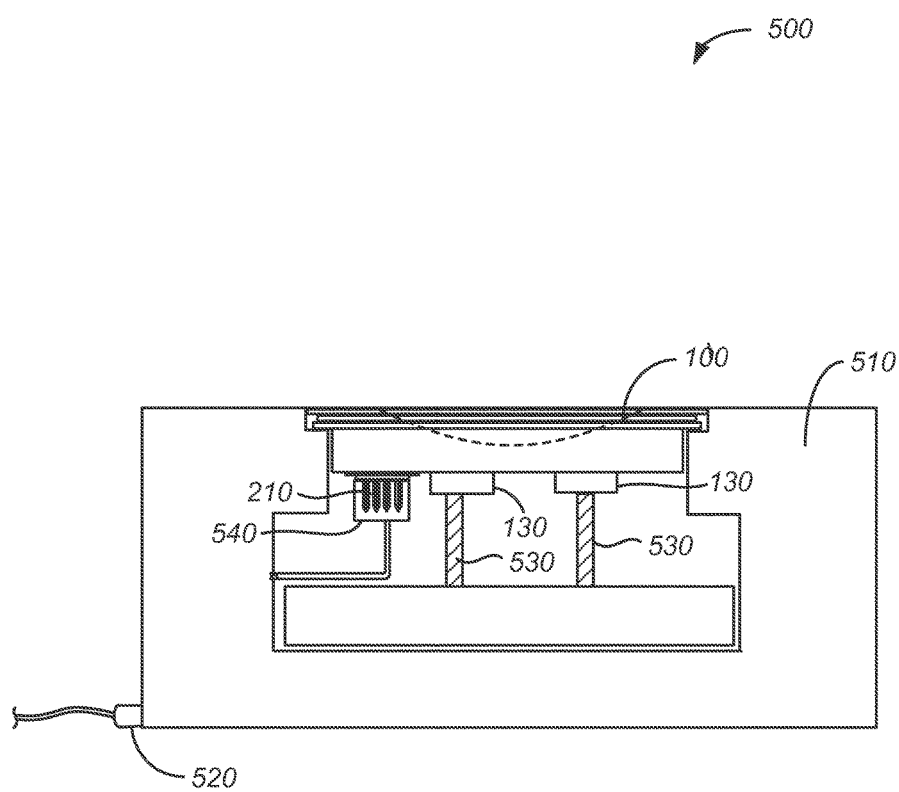
FIG. 5 is a simplified cross-section of a charging device incorporating the wireless charging assembly, according to some embodiments.

FIG. 5 is a simplified cross-section of wireless charging assembly 100 as used in a charging device 500, according to an embodiment. For example, charging device 500 can be a dock, docking station, portable battery, charger, or the like. As shown in FIG. 5, charging device 500 can comprise a base unit 510, charging assembly 100, and a power source 520. In some embodiments, base unit 510 can comprise an internal battery such that power can be supplied to four-pin connector 210 of charging assembly 100 without the need to maintain a continuous source of power from power source 520. Although shown for one example configuration of base unit 510, charging device 500 can be incorporated into any other suitable base unit having a different configuration and/or geometry, as will be explained with the non-limiting examples in FIGS. 16A-C.

As shown in FIG. 5, charging assembly 100 can be secured to base unit 510 using protrusions 130 having screw-holes. In FIG. 5, two protrusions are visible in the cross-section. Screws 530 can be used to fasten charging assembly 100 to base unit 510. Since charging assembly 100 is physically coupled to charging device 500 internally, protrusions 130 and screws may not be visible to a user of charging device 500. In some embodiments, bolts can be used in place of or in addition to screws. In some embodiments, charging assembly 100 can additionally or instead be secured to base unit 510 of charging device 500 by means of an adhesive.

Four-pin male connector 210 of charging assembly 100 can be attached to a corresponding four-pin female connector 540 of charging device 200. Although not apparent from FIG. 5, four-pin female connector 540 can be attached to power source 520 within base unit 510. In some embodiments, power source 520 can be further connected to an outlet such as a wall outlet or USB port through a flexible cable. The flexible cable can include a conductor pair and a thermally conductive shield layer. In some embodiments, four-pin connector 210 can be attached to a through-hole on a printed circuit board (PCB) of base unit 510 of charging device 500 and soldered in place. Alternatively or additionally, the pins from four-pin connector 210 can be soldered directly to wires that can be connected to the PCB or other circuitry electrically coupled to power source 520. In some embodiments, charging device 500 can include more than one of charging assembly 100 to accommodate a plurality of mobile devices for charging.

During a wireless power transfer operation from charging device 500 to a mobile device placed on charging surface 115, the mobile device can activate circuitry associated with managing and distributing power received from the charging device. In some embodiments, the mobile device can communicate to charging device 500 via a wireless communication channel that the mobile device is ready to receive power. After receiving such a signal, the charging device can generate an alternating or switch current in inductive coil 315, which in turn can induce a corresponding electrical current in the inductive receiver coil in the mobile device. The mobile device can use the received current to, for example, replenish the charge of one or more internal batteries. Although not apparent from FIG. 5, charging device 500 can also include a transceiver to communicate with the mobile device. In some embodiments, charging device 500 can vary or adjust dynamically characteristics of the transmitted power based on information received from the mobile device, or from an external source.

Figure 6A:
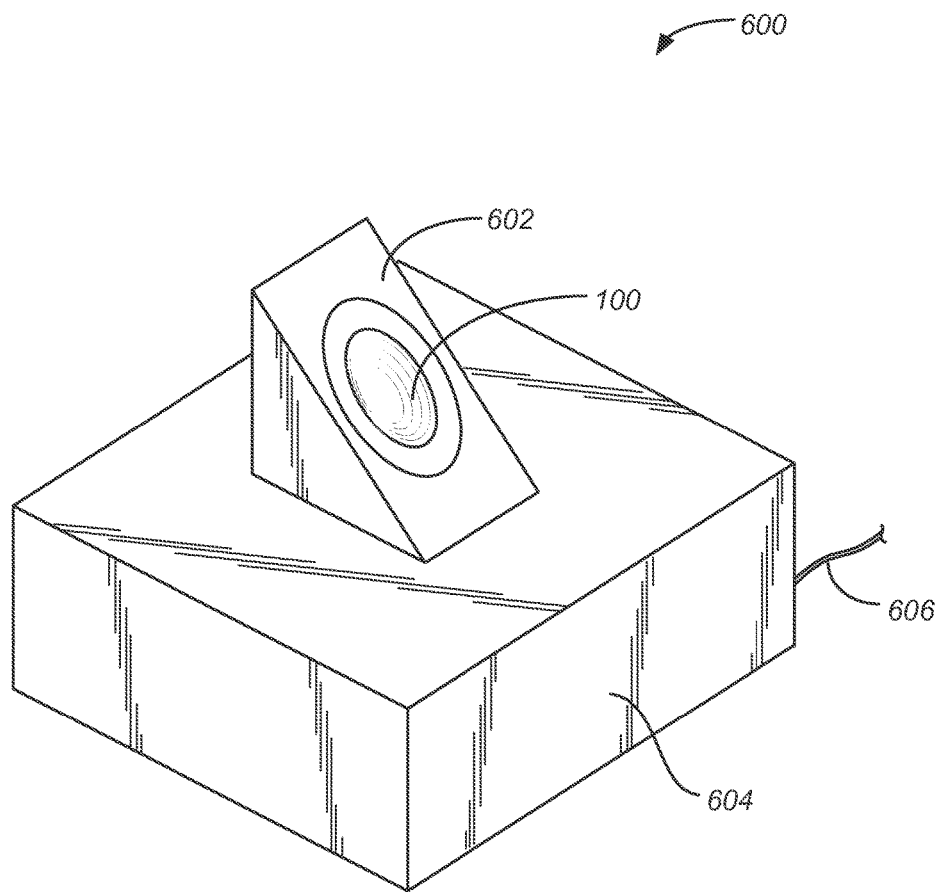
FIGS. 6A-6C illustrate three examples of charging devices incorporating the wireless charging assembly, according to embodiments.
Figure 6B:
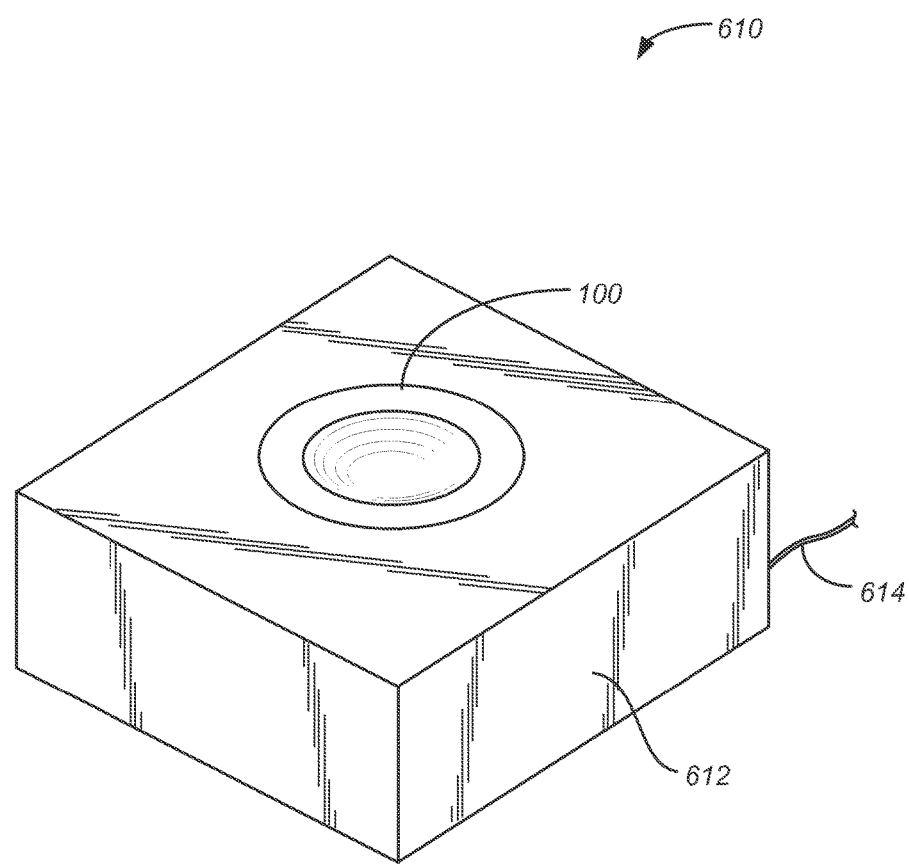
Figure 6C:
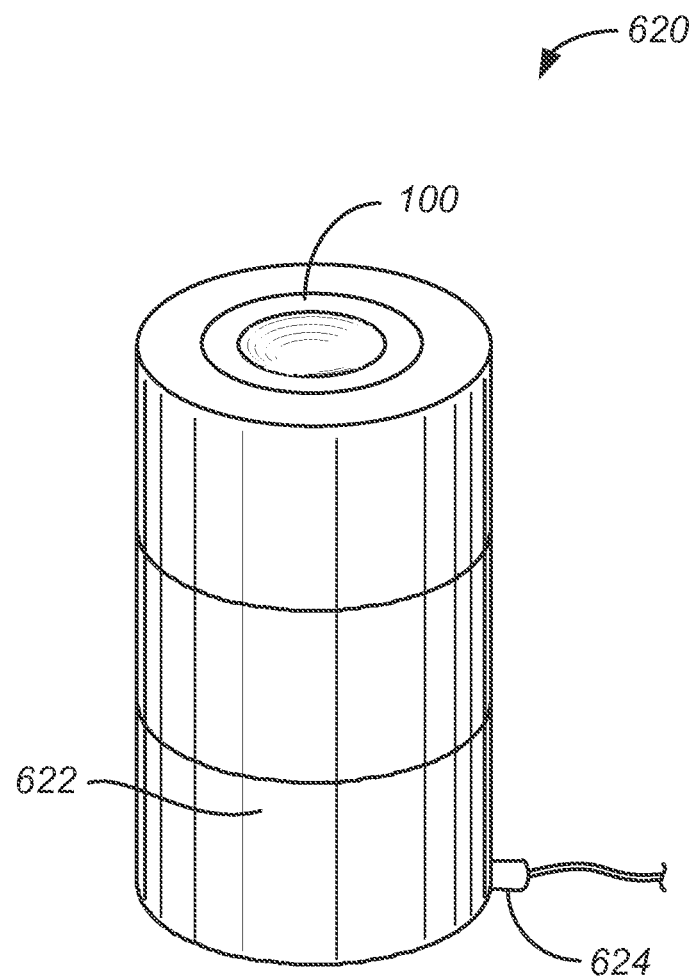

FIGS. 6A-C are three examples of charging devices 600, 610, and 620, for charging a mobile device utilizing charging assembly 100, according to embodiments. In embodiments, charging devices 600, 610, and 620 can provide additional functionality apart from charging of mobile devices. For example, charging devices 600, 610, and 620 can also play media content stored in the mobile device by way of a speaker and/or a video display.

FIG. 6A is a simplified illustration of one example charging device 600 incorporating charging assembly 100. As shown in FIG. 6A, charging device 600 includes a base structure 604. Pedestal structure 602 can be mounted on base structure 604. Pedestal structure 602 can include charging assembly 100, which can be secured to pedestal structure 602 in various ways including protrusions 130 described herein. In some embodiments as depicted in charging device 600, a surface of pedestal structure 602 can be sheared, thereby forming an angle with a surface of base structure 604. In some embodiments, this angle can be less than forty five degrees, thereby preventing a mobile device from sliding off while placed on the sheared surface of pedestal 602. Although not shown in FIG. 6A, charging device 600 can include a support member near the base of pedestal structure configured to prevent such sliding of a mobile device. In some embodiments, when a mobile device is placed on charging assembly 100 of charging device 600, magnet 350 (shown in FIG. 3) can interact with a corresponding magnet within the mobile device, thereby helping align transmitter coil 315 and the inductive receiver coil in the mobile device for efficient power transfer. Magnet 350 in charging assembly 100 can also interact with the magnet in the mobile device to prevent the mobile device from sliding off the charging device.

Charging assembly 100 can be mounted in pedestal 602 such that charging surface 115 faces outward on the sheared surface of pedestal 602 as shown in FIG. 6A. In some embodiments, a mobile device such as a smart watch can be placed on charging surface 115 for charging. Power, such as USB power, can be supplied to charging device 600 through a power source 606 in base structure 604. Power source 606 can be connected to an AC outlet, USB charging port, a power adapter, or other appropriate source of power. In some embodiments, charging device 600 can function as a nightstand for a wearable mobile device or other mobile device. From a user's perspective, all that may be visible of charging assembly 100 can be charging surface 115. The rest of the components of charging assembly 100 can be disposed in housing 140 inside pedestal 602 and hence hidden from view. Charging device 600 can provide additional functionality apart from charging mobile devices in some embodiments.

FIG. 6B is a simplified illustration of another example charging device 610 incorporating charging assembly 100. As shown in FIG. 6B, charging device 610 includes a base structure 612. Base structure 612 comprises a recess in which charging assembly 100 is disposed with charging surface 115 visible to a user. Charging device 610 can be connected to a source of power supply through power source 614 in base structure 612. As shown in FIG. 6B, charging device 610 can include a planar arrangement where a shared outer surface includes charging surface 115 of charging assembly 100 and an outer surface of base structure 612. In some embodiments, a portion of charging surface 115 (e.g., the peripheral outer region) can be concealed by the outer surface of base structure 612. Charging device 610 can provide additional functionality apart from charging mobile devices in some embodiments.

FIG. 6C is simplified illustration of another example charging device 620 incorporating charging assembly 100. Charging device 620 can be a portable battery and can include a power storage battery not shown in FIG. 6C. As shown in FIG. 6C, charging device 620 includes a base structure 622 comprising a storage battery and a power source 624. Power source 624 can be connected to a power supply such as a USB power supply, thereby charging the battery in base structure 622. In some embodiments, the battery in base structure 622 can be charged by placing charging device 620 in a battery charging unit. Although depicted as a cylinder in FIG. 6C, base structure 622 can be in any appropriate shape and geometry. Charging assembly 100 can be mounted on top of charging device 620 such that charging surface 115 is exposed (e.g., at the top of the cylinder).

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teaching

What is claimed is:

1. A wireless charging assembly comprising:
   a housing including a charging surface;
   a ferrimagnetic sleeve disposed within the housing, the ferrimagnetic sleeve including first and second opposing faces, a first opening extending from the first face to the second face through the ferrimagnetic sleeve, and a recess surrounding the first opening and open at the first face;
   an inductive coil disposed within the recess between the charging surface and the second face of the ferrimagnetic sleeve, the inductive coil being configured to wirelessly transmit power across the charging surface;
   a printed circuit board (PCB) defining a second opening; and
   a magnet surrounded by a casing disposed within the first and second openings, the casing having a flange member contacting the second face of the ferrimagnetic sleeve, interaction between the flange member and the second face of the ferrimagnetic sleeve preventing movement of the casing through the first opening and toward the charging surface.

2. The wireless charging assembly of claim 1, wherein the housing further includes a plurality of protrusions, each protrusion including a threaded screw hole configured to receive a screw or bolt.

3. The wireless charging assembly of claim 1, wherein the housing comprises a cap structure coupled to a housing component, the housing component including an exterior surface and a sidewall extending between the exterior surface and a lip that extends outward from the sidewall, the lip of the housing component being coupled to the cap structure.

4. The wireless charging assembly of claim 1,
   wherein the ferrimagnetic sleeve is disposed between the PCBA and the charging surface.

5. The wireless charging assembly of claim 4, wherein the PCBA comprises one or more contact pads configured to receive wires from the inductive coil.

6. The wireless charging assembly of claim 5 further comprising a guide element disposed in a notched portion of the ferrimagnetic sleeve, the guide element configured to guide the wires from the inductive coil to the one or more contact pads.

7. The wireless charging assembly of claim 4, further comprising:
   a connector attached to the PCBA and extending from a surface of the PCBA through an aperture defined by an exterior surface of the housing, the connector being electrically coupled to the inductive coil.

8. The wireless charging assembly of claim 4,
   wherein the charging surface has a concave geometry.

9. The wireless charging assembly of claim 8, wherein the casing physically and electrically isolates the magnet from both the PCBA and the ferrimagnetic sleeve.

10. A wireless charging assembly, comprising:
    a housing including an exterior housing surface, a sidewall extending between the exterior housing surface and a lip that extends outward from the sidewall along a perimeter of the housing;
    a cap structure having a charging surface and an interior-facing surface opposite the charging surface, the interior-facing surface coupled to the housing at the lip;
    a ferrimagnetic sleeve disposed within the housing, the ferrimagnetic sleeve including first and second opposing faces, a central opening extending from the first face to the second face through the ferrimagnetic sleeve, and a recess surrounding the central opening and open at the first face;
    an inductive coil disposed within the recess between the interior-facing surface and the second face of the ferrimagnetic sleeve, the inductive coil configured to wirelessly transmit power across the charging surface; and
    a printed circuit board assembly (PCBA) disposed within the housing between the second face of the ferrimagnetic sleeve and the exterior housing surface, the PCBA defining a hollow portion; and
    a magnet disposed within a casing disposed within both the central opening of the ferrimagnetic sleeve and the hollow portion of the PCBA, the casing having a flange member contacting the second face of the ferrimagnetic sleeve, wherein interaction between the flange member and the second face of the ferrimagnetic sleeve prevents movement of the casing closer to the interior-facing surface of the cap structure.

11. The wireless charging assembly of claim 10, wherein the exterior housing surface further includes a plurality of protrusions, each protrusion including a threaded screw hole configured to receive a screw or a bolt.

12. The wireless charging assembly of claim 10 further comprising an adhesive material disposed between the cap structure and the housing.

13. The wireless charging assembly of claim 10, wherein the wireless charging assembly is substantially impermeable to liquids.

14. The wireless charging assembly of claim 10 wherein the PCBA comprises one or more contact pads configured to receive wires from the inductive coil.

15. The wireless charging assembly of claim 14 further comprising a guide element disposed in a notched portion of the ferrimagnetic sleeve, the guide element configured to guide the wires from the inductive coil to the one or more contact pads.

16. The wireless charging assembly of claim 10, wherein the charging surface has a concave geometry.

17. The wireless charging assembly of claim 10, wherein the casing physically and electrically isolates the magnet from both the PCBA and the ferrimagnetic sleeve.

* * * * *